(12) United States Patent
Bereswill et al.

(10) Patent No.: US 12,372,109 B2
(45) Date of Patent: Jul. 29, 2025

(54) BUTTON ASSEMBLIES FOR EXTENSION POLES

(71) Applicant: Hubbell Incorporated, Shelton, CT (US)

(72) Inventors: Lawrence Gerard Bereswill, Columbia, MO (US); Ahmad Atallah, Columbia, MO (US); Adam Paul Brown, Columbia, MO (US); Gregory Kevin Tetro, Columbia, MO (US)

(73) Assignee: Hubbell Incorporated, Shelton, CT (US)

( * ) Notice: Subject to any disclaimer, the term of this patent is extended or adjusted under 35 U.S.C. 154(b) by 536 days.

(21) Appl. No.: 17/722,230

(22) Filed: Apr. 15, 2022

(65) Prior Publication Data
US 2022/0333630 A1 Oct. 20, 2022

Related U.S. Application Data

(60) Provisional application No. 63/175,608, filed on Apr. 16, 2021.

(51) Int. Cl.
*F16B 7/10* (2006.01)
*B25G 1/04* (2006.01)

(52) U.S. Cl.
CPC ............... *F16B 7/105* (2013.01); *B25G 1/04* (2013.01); *Y10T 403/32483* (2015.01)

(58) Field of Classification Search
CPC ... F16B 7/105; B25G 1/04; Y10T 403/32483; Y10T 403/32524
See application file for complete search history.

(56) References Cited

U.S. PATENT DOCUMENTS

| 2,291,593 | A | * | 7/1942 | Hubbard | B25G 1/04 294/174 |
| 4,079,978 | A | | 3/1978 | McMullin | |
| 4,088,008 | A | | 5/1978 | Whatling | |
| 4,869,280 | A | | 9/1989 | Ewing | |
| 5,070,620 | A | * | 12/1991 | Crain | F16B 7/10 403/324 |

(Continued)

FOREIGN PATENT DOCUMENTS

CN 202082220 U 12/2011

OTHER PUBLICATIONS

International Search Report and Written Opinion for corresponding International (PCT) application No. PCT/US2022/025111, 10 pages, dated Aug. 10, 2021.

(Continued)

*Primary Examiner* — Michael P Ferguson
(74) *Attorney, Agent, or Firm* — Ruggiero McAllister & McMahon LLC

(57) ABSTRACT

A button assembly is provided that includes a plug, a button, and a biasing member. The plug can be received in an inner pole section. The button is slidably received in the plug for movement between a locked position extended from the plug and an unlocked position retracted with respect to the plug. The biasing member biases the button to the locked position. The button has a land region, a cammed region, and a locking edge. The cammed region slopes from the land region in a direction towards the locking edge. The land region is remote from any pinch point formed between the plug and the locking edge.

16 Claims, 6 Drawing Sheets

(56) References Cited

U.S. PATENT DOCUMENTS

| | | | |
|---|---|---|---|
| 5,083,883 A | 1/1992 | Ueda | |
| 5,255,993 A | 10/1993 | Kovacs | |
| 5,593,196 A | 1/1997 | Baum | |
| 6,875,917 B1 | 4/2005 | Wood | |
| 7,967,259 B2* | 6/2011 | Nakatani | F16B 7/042 |
| | | | 248/407 |
| 8,469,423 B1 | 6/2013 | Crowley | |
| 8,485,751 B2 | 7/2013 | Vetesnik | |
| 8,506,198 B2 | 8/2013 | West | |
| 8,596,899 B2 | 12/2013 | Braun | |
| 8,641,314 B2 | 2/2014 | Thacker | |
| 8,926,214 B2 | 1/2015 | Lah | |
| 10,288,123 B2 | 5/2019 | Newth | |
| 10,407,916 B1* | 9/2019 | Samad | E04F 11/1817 |
| 12,059,797 B2 | 8/2024 | Liou | |
| 2011/0101716 A1 | 5/2011 | Nolte | |
| 2013/0236237 A1 | 9/2013 | Schmidt | |
| 2022/0362922 A1* | 11/2022 | Tata | B25G 1/04 |

OTHER PUBLICATIONS

Telescoping Disconnect Stick Catalog ID C4031018, Jun. 2, 2019.

* cited by examiner

BUTTON ASSEMBLIES FOR EXTENSION POLES

CROSS REFERENCE TO RELATED APPLICATIONS

This application claims the benefit of U.S. Provisional Application 63/175,608 filed Apr. 16, 2022, the contents of which are incorporated by reference herein.

BACKGROUND

1. Field of the Invention

The present disclosure is related to extension poles. More particularly, the present disclosure is related to button assemblies for extension poles.

2. Description of Related Art

Extension poles are used in a number of different fields and for a number of different uses. Here, the length of the pole is adjustable by having one pole section slidably secured in a second pole section. The length of the pole is adjusted by extending/retracting the pole sections with respect to one another. In many instances, the pole sections are held in one or more desired positions by way of a button. The button is secured to the inner section so as to extend through an opening in the wall of the outer section. In this manner, the button prevents movement of the pole sections with respect to one another. To adjust the length, the button is moved inward to clear the wall of the outer pole section.

Extension poles as used by the present application can include, but are not limited to, those used for extending/retracting the reach of tools and cleaning implements. Further, extension poles as used by the present application can, but are not limited to, those used for extending/retracting a supporting member including ladders, tent poles, lally columns, and others.

One particular use has been in the field of the electrical arts—where installation and maintenance of electrical equipment on utility structures are made with the use of a utility worker hotstick. The hotstick can isolate the utility worker, via distance and/or insulating materials, from electrical currents and voltages in the equipment being installed/serviced.

Unfortunately, it has been found by the present disclosure that prior buttons can result in a pinch point forming between the button and the wall of the section of the pole.

Accordingly, it has been determined by the present disclosure that there is a need for button assemblies and extension poles having such assemblies that overcome, alleviate, and/or mitigate one or more of the aforementioned and other deleterious effects of the prior art.

SUMMARY

A button assembly is provided that includes a plug, a button, and a biasing member. The plug can be received in an inner pole section. The button is slidably received in the plug for movement between a locked position extended from the plug and an unlocked position retracted with respect to the plug. The biasing member biases the button to the locked position. The button has a land region, a cammed region, and a locking edge. The cammed region slopes from the land region in a direction towards the locking edge. The land region is remote from any pinch point formed between the plug and the locking edge.

In some embodiments either alone or together with any one or more of the aforementioned and/or after-mentioned embodiments, the button has a width (W) so dimensioned that a user's digit is wider, by between 25% to 75%, than the width.

In some embodiments either alone or together with any one or more of the aforementioned and/or after-mentioned embodiments, the button has a width (W) so dimensioned that a user's digit is wider, by between 40% to 60%, than the width.

In some embodiments either alone or together with any one or more of the aforementioned and/or after-mentioned embodiments, the land region has a length (L1) and the cammed region has a length (L2) and the button has a ratio L1:L2 that is between 80:20.

In some embodiments either alone or together with any one or more of the aforementioned and/or after-mentioned embodiments, the land region has a length (L1) and the cammed region has a length (L2) and the button has a ratio L1:L2 that is between 65:35.

In some embodiments either alone or together with any one or more of the aforementioned and/or after-mentioned embodiments, the button has a width (W) so dimensioned that a user's digit is wider, by between 40% to 60%, than the width, and the land region has a length (L1) and the cammed region has a length (L2), where the button has a ratio L1:L2 that is between 80:20.

In some embodiments either alone or together with any one or more of the aforementioned and/or after-mentioned embodiments, the assembly has a non-circular cross-section defining at least one flattened region, the button being positioned in the flattened region.

In some embodiments either alone or together with any one or more of the aforementioned and/or after-mentioned embodiments, the at least one flattened region has a linear shape or an elliptical shape.

In some embodiments either alone or together with any one or more of the aforementioned and/or after-mentioned embodiments, the land region has a shape that corresponds to a shape of the at least one flattened region.

In some embodiments either alone or together with any one or more of the aforementioned and/or after-mentioned embodiments, the non-circular cross section is a shape selected from a group consisting of an oval shape, a polygonal shape, triangular shape, a rectangular shape, a polygonal shape with rounded edges, a triangle with rounded edges, and Reuleaux triangle In some embodiments either alone or together with any one or more of the aforementioned and/or after-mentioned embodiments, the button and/or the plug are configured to ensure a linear or piston like movement between the locked and unlocked positions.

In some embodiments either alone or together with any one or more of the aforementioned and/or after-mentioned embodiments, the button further includes one or more shoulders and the plug further includes a corresponding number of cavities, the one or more shoulders being slidably received in a respective one of the corresponding number of cavities.

In some embodiments either alone or together with any one or more of the aforementioned and/or after-mentioned embodiments, the plug includes a lip such that the lip defines a bottom end of an inner pole section when disposed therein.

In some embodiments either alone or together with any one or more of the aforementioned and/or after-mentioned embodiments, the cammed region is sloped from the land region towards the lip.

In some embodiments either alone or together with any one or more of the aforementioned and/or after-mentioned embodiments, the biasing member is selected from a group consisting of a compression spring, an elastomeric member, and a leaf spring A telescoping pole is also provided. The pole includes an inner section, an outer section, and a button assembly. The inner section has an inner button opening and the outer section has an outer button opening. The inner section is slidably disposed in the outer section. The button assembly is in the inner section and has a plug, a button, and a biasing member. The plug is in the inner section with the button slidably received in the plug for movement between a locked position and an unlocked position. The biasing member biases the button to the locked position. The button has a land region, a cammed region, and a locking edge. The cammed region is sloped from the land region in a direction towards the locking edge. The button, when the inner and outer button openings are in registered with one another and the button is the locked position, extends through inner and outer button openings with the locking edge abutting the outer button opening. The button, when the inner and outer button openings are in registered with one another and the button is the unlocked position, extends so that the locking edge is free from abutting the outer button opening. The land region is remote from any pinch point formed between the plug and the locking edge or between the locking edge and the outer button opening.

In some embodiments either alone or together with any one or more of the aforementioned and/or after-mentioned embodiments, the button has a width (W) so dimensioned that a user's digit is wider, by between 40% to 60%, than the width, and the land region has a length (L1) and the cammed region has a length (L2), the button has a ratio L1:L2 that is between 80:20.

In some embodiments either alone or together with any one or more of the aforementioned and/or after-mentioned embodiments, the outer section has a plurality of spaced apart outer button openings, each of the spaced apart outer button openings defining a different discrete position of the inner and outer sections with respect to each other.

In some embodiments either alone or together with any one or more of the aforementioned and/or after-mentioned embodiments, the inner section, the outer section, and the button assembly further have a non-circular cross-section defining at least one flattened region. The button, the inner button opening, and the outer button opening are positioned in the flattened region.

In some embodiments either alone or together with any one or more of the aforementioned and/or after-mentioned embodiments, the pole is a utility worker hotstick.

The above-described and other features and advantages of the present disclosure will be appreciated and understood by those skilled in the art from the following detailed description, drawings, and appended claims.

DETAILED DESCRIPTION

Figure 1:
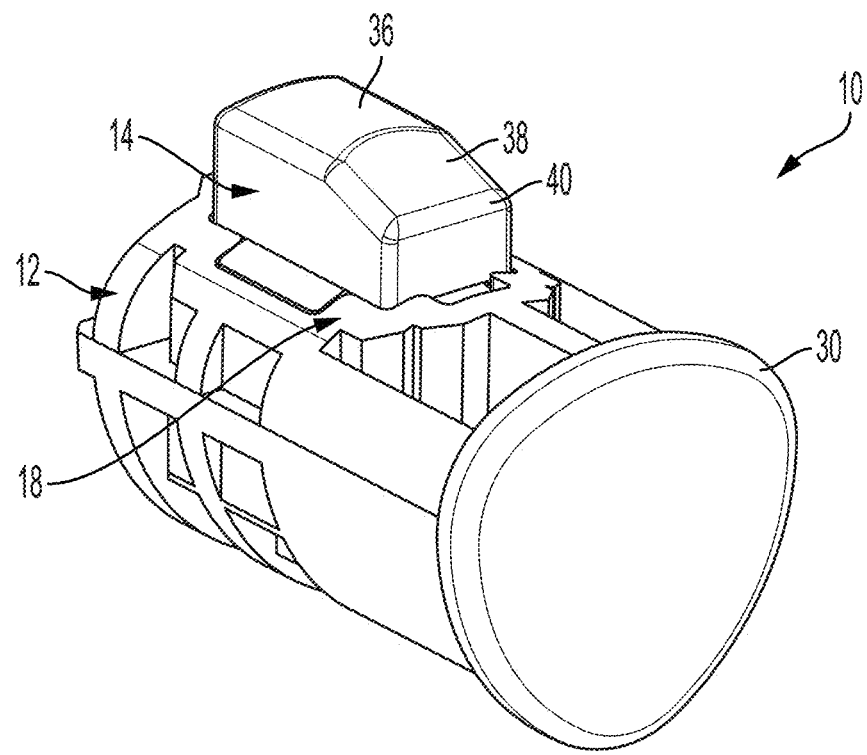
FIG. 1 is a first perspective view of a button assembly according to the present disclosure in a first or normal position.
Figure 2:
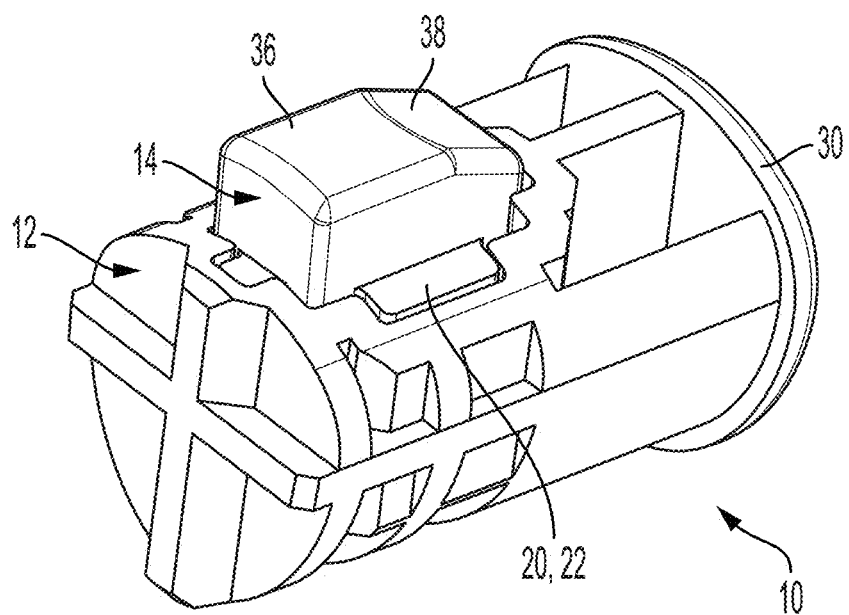
FIG. 2 is a second perspective view of the assembly of FIG. 1 in the first or normal position.

Referring to the drawings and in particular with simultaneous reference to FIGS. 1-5, an exemplary embodiment of a button assembly according to the present disclosure is shown and is generally referred to by reference numeral 10. Assembly 10 includes a plug 12, a button 14, and a biasing member 16.

Figure 3:
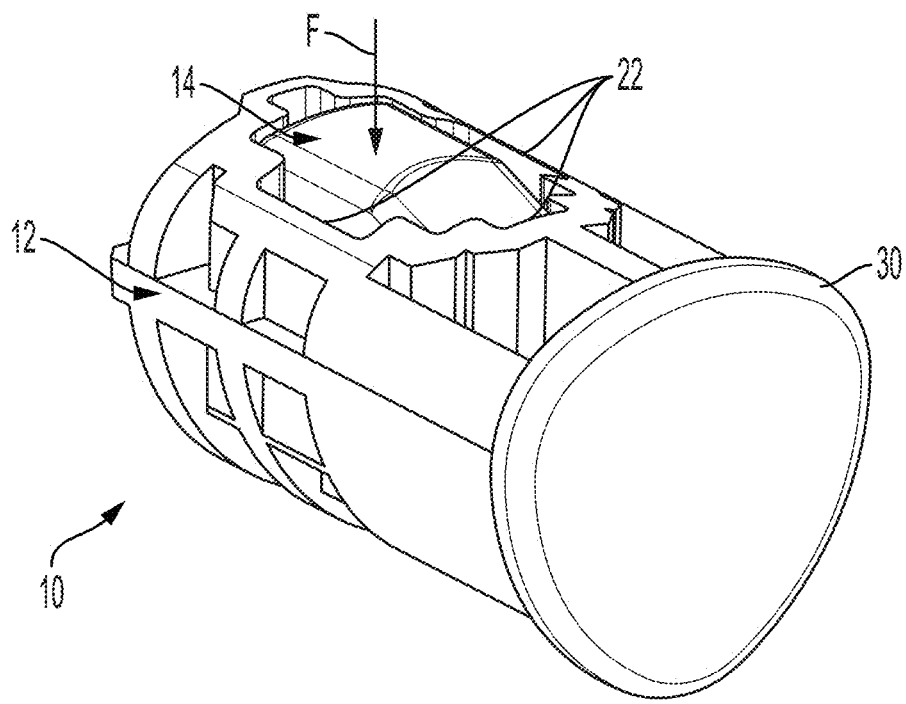
FIG. 3 is the first perspective view of the assembly of FIG. 1 in a second or biased position.
Figure 4:
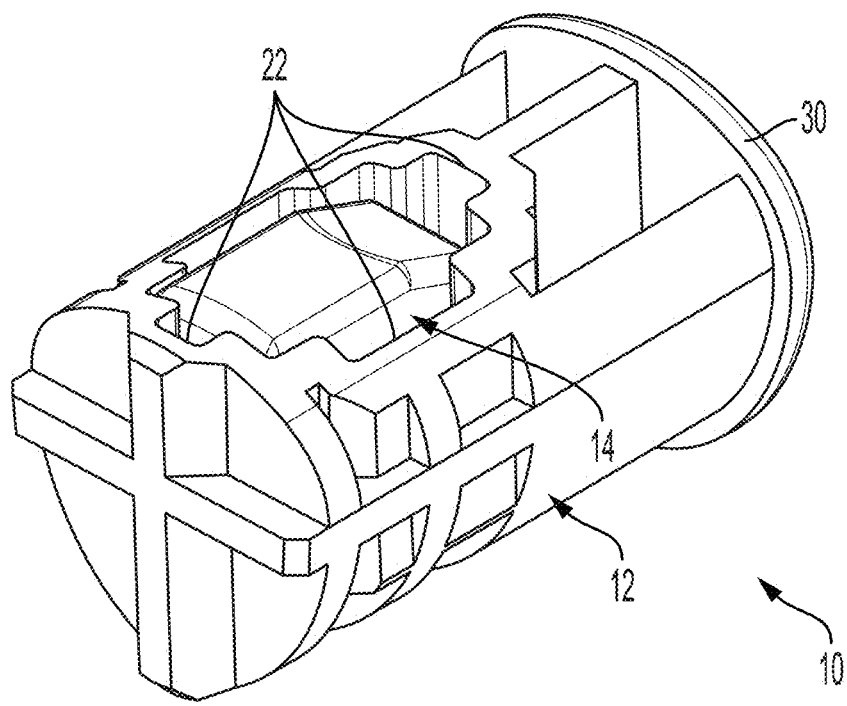
FIG. 4 is the second perspective view of the assembly of FIG. 3 in the second or biased position.
Figure 5:
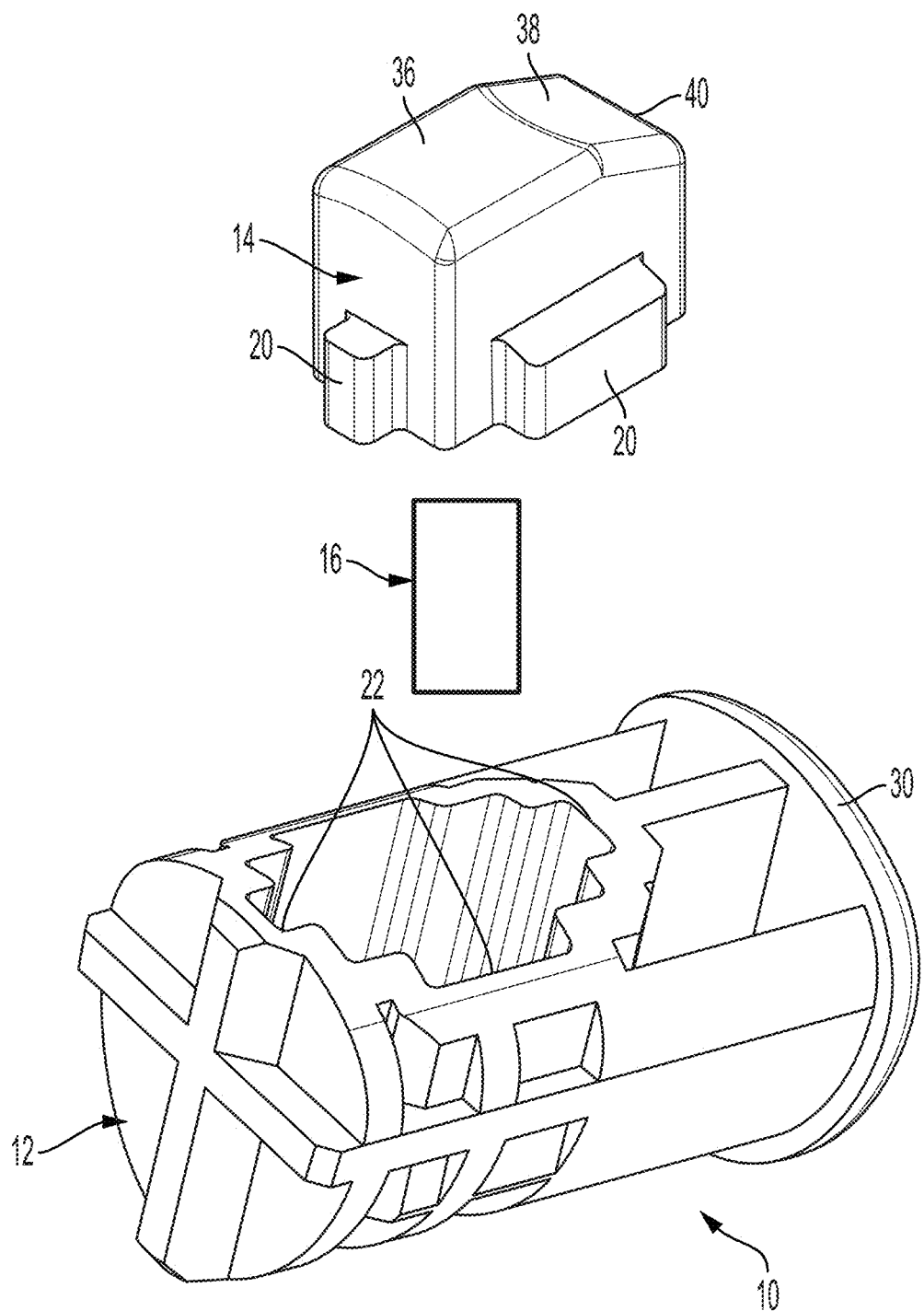
FIG. 5 is a disassembled perspective view of the assembly of FIG. 1.

Plug 12 slidably receives button 14 so that the button is movable between a normal or locked position (FIGS. 1-2) and an unlocked position (FIGS. 3-4). Member 16 is positioned between plug 12 and button 14 so as to normally bias the button to the normal position.

Upon the application of a sufficient force (F) on button 14, the biasing force of member 16 on the button can be overcome to move the button with respect to plug 12 from the locked to the unlocked position. Biasing member 16 can be any desired component configured to apply sufficient biasing force on button 14. For example, member 16 can be a compression spring, an elastomeric member, a leaf spring, and others.

Advantageously, assembly 10 is shaped and configured to mitigate the formation of pinch points between plug 12 and button 14 during use. Moreover, assembly 10 is shaped and configured to balance the width of button 14 to mitigate instances of the user's finger or thumb (hereinafter "digit") entering into the space where a pinch point can form.

In some embodiments, assembly 10 can have a non-circular cross-section that defines at least one flattened region 18, which finds use with extension poles having a non-circular cross-section. Here, assembly 10 is configured so that button 14 is aligned with flattened region 18.

As used herein the term "flattened region" shall mean a region that has a linear shape or an elliptical shape. Further, as used herein the term "non-circular" shall include ovoidal shapes and polygonal shapes including, but not limited to triangular shapes, rectangular shapes, and others. When the shape is polygonal, it is contemplated for the edges of the polygonal shape to be rounded. In the illustrated embodiment, assembly 10 is shown as having a triangular cross-section with rounded edges. In other embodiments, the rounded triangular cross-section of assembly 10 can take the form of a Reuleaux triangle.

In some embodiments, button 14 and/or plug 12 are configured to ensure a linear or piston like movement. For example, button 14 can include one or more shoulders 20 that are slidably received in a corresponding number of cavities 22 defined in plug 12.

The configuration of button 14 is described in more detail with simultaneous reference to FIGS. 6-10. Here, assembly 10 is shown with respect to a pole 24 having an inner section 26 and an outer section 28—where pole is in this embodiment a utility worker hotstick. Assembly 10 and pole 24 have cross-sectional shapes such that plug 12 of the assembly can be secured in inner section 26.

It should be recognized that pole 24 is described for reasons of simplicity as having only two sections, inner section 26 and outer section 28. However, it is contemplated by the present disclosure for pole 24 to have any desired number of sections—from as few as two sections to as many as twenty sections. In embodiments with more than two sections, the inner most section is generally the tip section—namely the section handled by the utility worker.

Preferably, all sections 26, 28 of pole 24 are made of electrically insulating material. However, it is also contemplated by the present disclosure for only the tip section 26 of pole 24 to be made of electrically insulating material.

Sections 26, 28 are hollow members that allow the sections to slide within one another. However, it is recognized that the tip section 26 does not have any further section sliding therein. Thus, it is contemplated by the present disclosure for tip section 26 to be solid or filled except in the region that receives assembly 10. In the embodiment where tip section 26 is solid, the tip section is made of an electrically insulating material. In the embodiment where tip section is filled, the tip section can include an electrically insulating fill within the section. The electrically insulating fill can be present in the entire tip section 26. Alternately, the electrically insulating fill can be present only in the region where the utility worker grasps pole 24—namely at the region from assembly 10 to a region about three feet from the assembly. Of course, more or less than three feet are contemplated by the present disclosure. The region of pole 24 defines a true insulating portion of the pole to electrically isolate the utility worker from electrical loads induced in the pole.

Plug 12 can include a lip 30 such that, when placed inside of inner section 26, the lip defines the bottom end of the inner section as shown in FIGS. 7-10. Here, portions of inner section 26 and outer section 28 are shown in phantom for reasons of clarity.

Inner section 26 has an inner button opening 32 and outer section 28 has a corresponding outer button opening 34.

Figure 6:
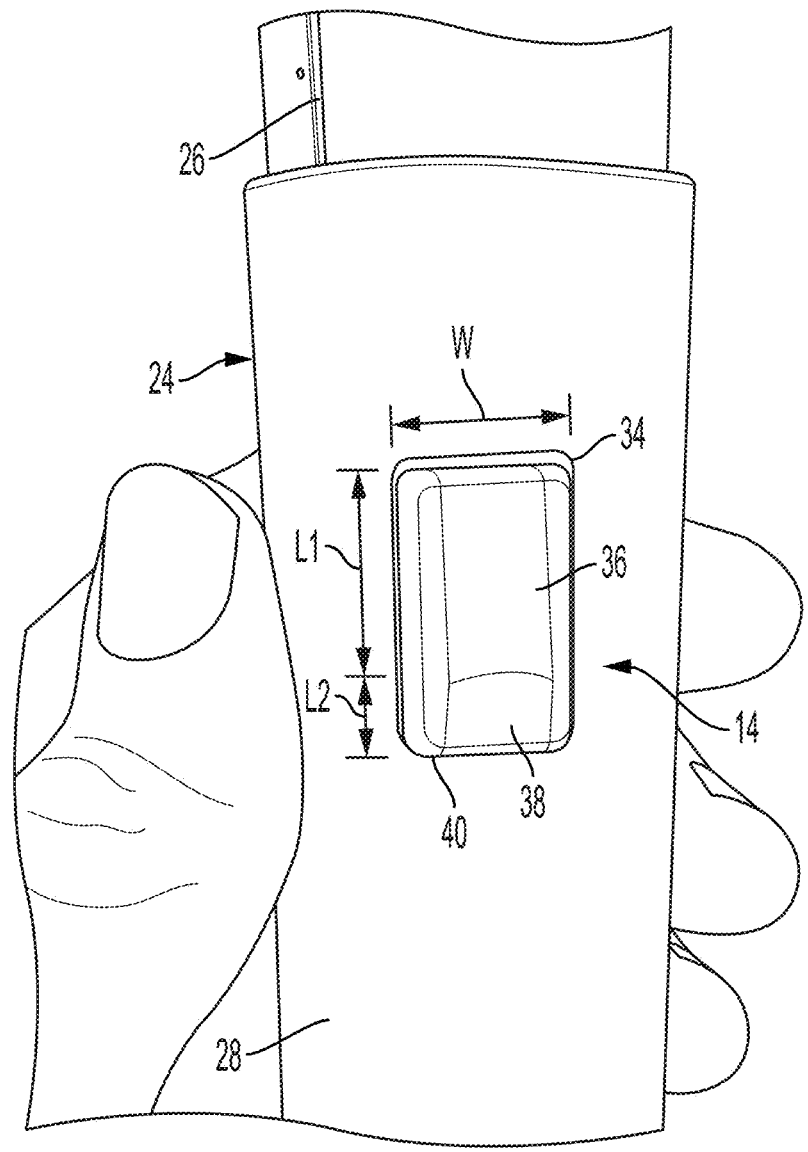
FIG. 6 is a side view of the assembly of FIG. 1 shown installed in a telescoping pole.
Figure 7:
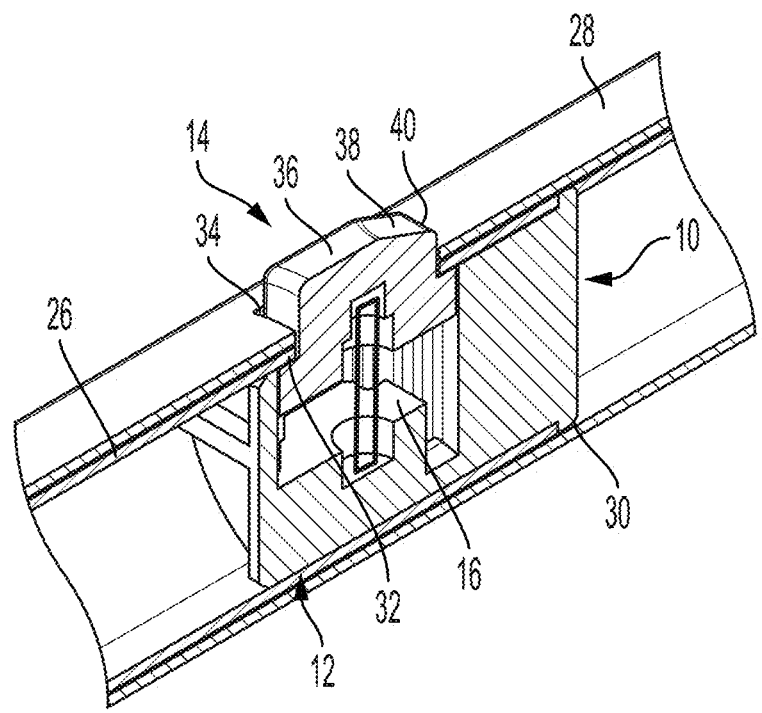
FIG. 7 is a section view of the assembly in the first or normal position shown in relation to a pole section with portions of the assembly shown in phantom.
Figure 8:
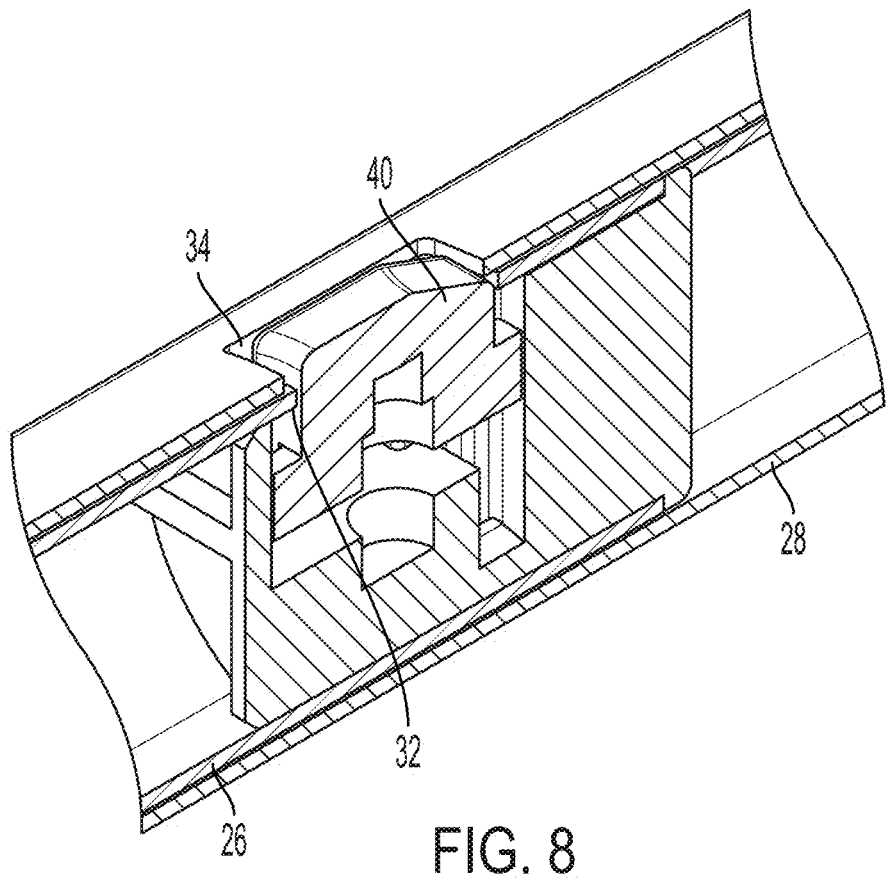
FIG. 8 is a sectional view of the assembly of FIG. 7 between the first and second positions.
Figure 9:
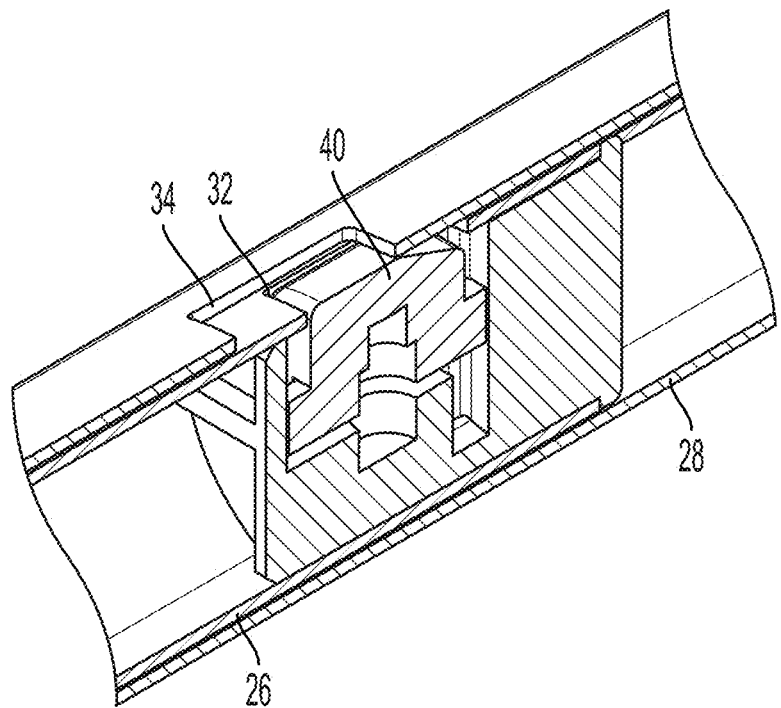
FIG. 9 is another sectional view of the assembly of FIG. 7 between the first and second positions.
Figure 10:
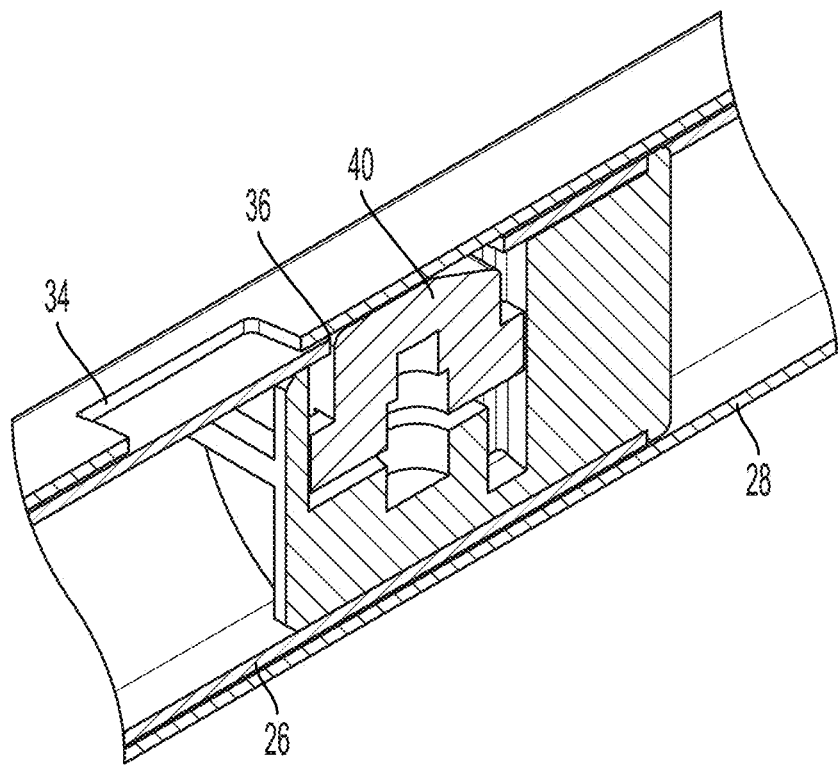
FIG. 10 is final sectional view of the assembly of FIG. 7 in the second position.

As shown in FIG. 6, assembly 10 is positioned in inner section 26 and the inner section is positioned in outer section 28, with openings 32, 34 in registration with one another and with button 14 extending, in the normal position, through both of the openings. In this position, assembly 10 locks sections 26, 28 in the position defined by opening 34 of the outer section. In some embodiments, outer section 28 can have a plurality of openings 34 (not shown) defining different discrete positions of sections 26, 28 with respect to one another.

Button 14 includes a land or flat region 36 and a sloped or cammed region 38. Cammed region 38 is sloped from land region 36 in direction of retraction of sections 26, 28—namely towards a locking edge of button 14. Additionally, cammed region 38 is sloped from land region 36 towards lip 30.

In some embodiments, land region 36 has a shape that corresponds to the shape of flattened region 18. Thus, land region 36 can have a linear shape or an elliptical shape similar to that of flattened region.

Button 14 is advantageously configured with a combination of button width (W) and a ratio of a length (L1) of land region 36 to a length (L2) of cammed region 38 that work synergistically to mitigate pinching of the user's digit.

Without wishing to be bound by any particular theory, it is believed by the present disclosure that providing the lengths (L1, L2) so dimensioned that the user's digit is biased towards—or has more room to rest on—land region 36 as compared to cammed region 38 can mitigate the user's digit from entering into opening 34 of outer section 28. In some embodiments, assembly 10 has button 14 so dimensioned that the ratio L1:L2 is between 80:20, more particularly between 70:30, with between 65:35 being most preferred, and any subranges therebetween.

Also without wishing to be bound by any particular theory, it is believed by the present disclosure that providing button 14 with width (W) so dimensioned that the user's digit is wider, by between 25% to 75%, than the button width (and the opening 34 of outer section 28) can mitigate the user's digit from entering into opening 34 of outer section 28, preferably between 40% and 60% with about 50% being most preferred, and any subranges therebetween.

For example, in some literature the average width of a human thumb is indicated as being 1 inch (2.5 cm). In this example, it is contemplated by the present disclosure for button 14 to have width (W) of between 0.25 inches and 0.75 inches, with between 0.40 inches to 0.60 inches being preferred, with 0.50 inches being more preferred, and any subranges therebetween.

Moreover, it has been found by the present disclosure that the combination of button 14 so dimensioned as discussed above with both the ratio of button lengths (L1:L2) and the width (W) provides enhanced pinch reduction not previously possible.

As shown in FIGS. 7-10, during use, application of the force (F) on button 14 overcomes biasing member 16 to allow the button to move inward until a locking edge 40 of the button is within outer section 28—namely until edge 40 has cleared opening 34 in the outer section. It has been determined by the present disclosure that when a user's digit is on land region 36, cammed region 38 offsets edge 40 from the land region and, thus, from the user's digit. Simply stated, cammed region 38 ensures that any pinch point between edge 40 and opening 34 of outer section 28 is remote from the user's digit positioned on land region 36.

During compression or retraction of pole 24 in some embodiments of assembly 10, a user can start with their thumb on cammed region 38, slide their digit up the cammed region towards land region 36 while depressing button 14 into outer section 28 until edge 40 clears opening 34 of outer section 28 and rests on land region 36. During this process the user's fingers on the same hand can simultaneously grasp outer section 28 while the user's other hand grasps inner section 26—with their two hands applying a compressing or retracting force to the sections to collapse pole 24. Here, the direction of the thumb sliding on cammed region 38 is the same as the collapsing direction of sections 26, 28 and is away from any pinch point at edge 40.

In some embodiments, pole 24 can have one or more sections 26, 28 having multiple openings 32, 34. During extension of such a pole 24 where section 28 has more than one opening 34, a user can start with their thumb on land region 36 and depress button 14 into outer section 28 until edge 40 clears a first opening 34 of outer section 28. Once edge 40 clears the first opening 34, user's fingers on the same hand can simultaneously grasp outer section 28 while the user's other hand can grasp inner section 26—with their two hands applying an extension force to the sections to extend pole 24. Here, the user's thumb remains on land region 36 remote from any pinch point at edge 40. Pole 24 is extended until button 14 reaches the second opening 34 in outer section 28, where biasing member 16 urges the button through the second opening to hold first and second sections 26, 28 in the extended position defined by the second opening.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST button assembly 10
plug 12
button 14
biasing member 16
force (F)
flattened region 18
shoulders 20
cavities 22
pole 24
inner section 26
outer section 28
lip 30
inner button opening 32
outer button opening 34
land or flat region 36
sloped or cammed region 38
locking edge 40

What is claimed is:

1. A telescoping pole comprising:
an inner section having an inner button opening extending through a sidewall thereof;
an outer section having an outer button opening extending through a sidewall thereof, the inner section being coaxial with and slidably disposed within the outer section; and
a button assembly in the inner section, the button assembly having a plug, a button, and a biasing member, the plug comprising a raised lip radially-extending therefrom that defines a bottom end of the inner section when the plug is positioned in the inner section, the button being slidably received in an opening in a sidewall of the plug for movement between a locked position and an unlocked position, the biasing member biasing the button to the locked position, the button having an axially-extending land region comprising a concave contour for engaging a user's digit, a cammed region, and a radially-extending locking edge, the cammed region being sloped from the land region in a direction towards the locking edge and the raised lip,
wherein, when the inner and outer button openings are in registry with one another and the button is the locked position, the button extends through inner and outer button openings, with the locking edge abutting the outer button opening,
wherein, when the inner and outer button openings are in registry with one another and the button is depressed to the unlocked position, the button extends so that the locking edge is free from abutting the outer button opening, and
wherein, during retraction, a user can start with a digit on the cammed region, slide the digit up the cammed region towards the land region while depressing the button into the outer section until the locking edge clears the outer button opening with the digit resting on the land region in a position that is remote from any pinch point formed when the inner section retracts into the outer section between the locking edge and the outer button opening.

2. The pole of claim 1, wherein the button has a width (W) so dimensioned that a user's digit is wider, by between 25% to 75%, than the width.

3. The pole of claim 1, wherein the button has a width (W) so dimensioned that a user's digit is wider, by between 40% to 60%, than the width.

4. The pole of claim 1, wherein the land region has a length (L1) and the cammed region has a length (L2), wherein the button has a ratio L1:L2 that is approximately 80:20.

5. The pole of claim 1, wherein the land region has a length (L1) and the cammed region has a length (L2), wherein the button has a ratio L1:L2 that is approximately 65:35.

6. The pole of claim 1, wherein the plug comprises a non-circular cross-section defining at least one flattened region, the button being positioned in the flattened region.

7. The pole of claim 6, wherein the at least one flattened region has a linear shape or an elliptical shape.

8. The pole of claim 6, wherein the land region has a shape that corresponds to a shape of the at least one flattened region.

9. The pole of claim 6, wherein the non-circular cross section is a shape selected from a group consisting of an oval shape, a polygonal shape, triangular shape, a rectangular shape, a polygonal shape with rounded edges, a triangle with rounded edges, and Reuleaux triangle.

10. The pole of claim 1, wherein the button and/or the plug are configured to ensure a linear or piston like movement between the locked and unlocked positions.

11. The pole of claim 10, wherein the button further comprises one or more shoulders and the plug further comprises a corresponding number of cavities, the one or more shoulders being slidably received in a respective one of the corresponding number of cavities.

12. The pole of claim 1, wherein the biasing member is selected from a group consisting of a compression spring, an elastomeric member, and a leaf spring.

13. The pole of claim 1, wherein the button has a width (W) so dimensioned that a user's digit is wider, by between 40% to 60%, than the width, and wherein the land region has a length (L1) and the cammed region has a length (L2), wherein the button has a ratio L1:L2 that is approximately 80:20.

14. The pole of claim 1, wherein the outer section has a plurality of spaced apart outer button openings, each of the spaced apart outer button openings defining a different discrete position of the inner and outer sections with respect to each other.

15. The pole of claim 1, wherein the inner section, the outer section, and the plug further comprise a non-circular cross-section defining at least one flattened region, wherein the button, the inner button opening, and the outer button opening are positioned in the flattened region.

16. The pole of claim 1, wherein the pole is a utility worker hotstick.

* * * * *